Dec. 24, 1963  M. J. BOZICH  3,115,369
PNEUMATIC CONVEYING SYSTEM
Filed June 29, 1961  2 Sheets-Sheet 1
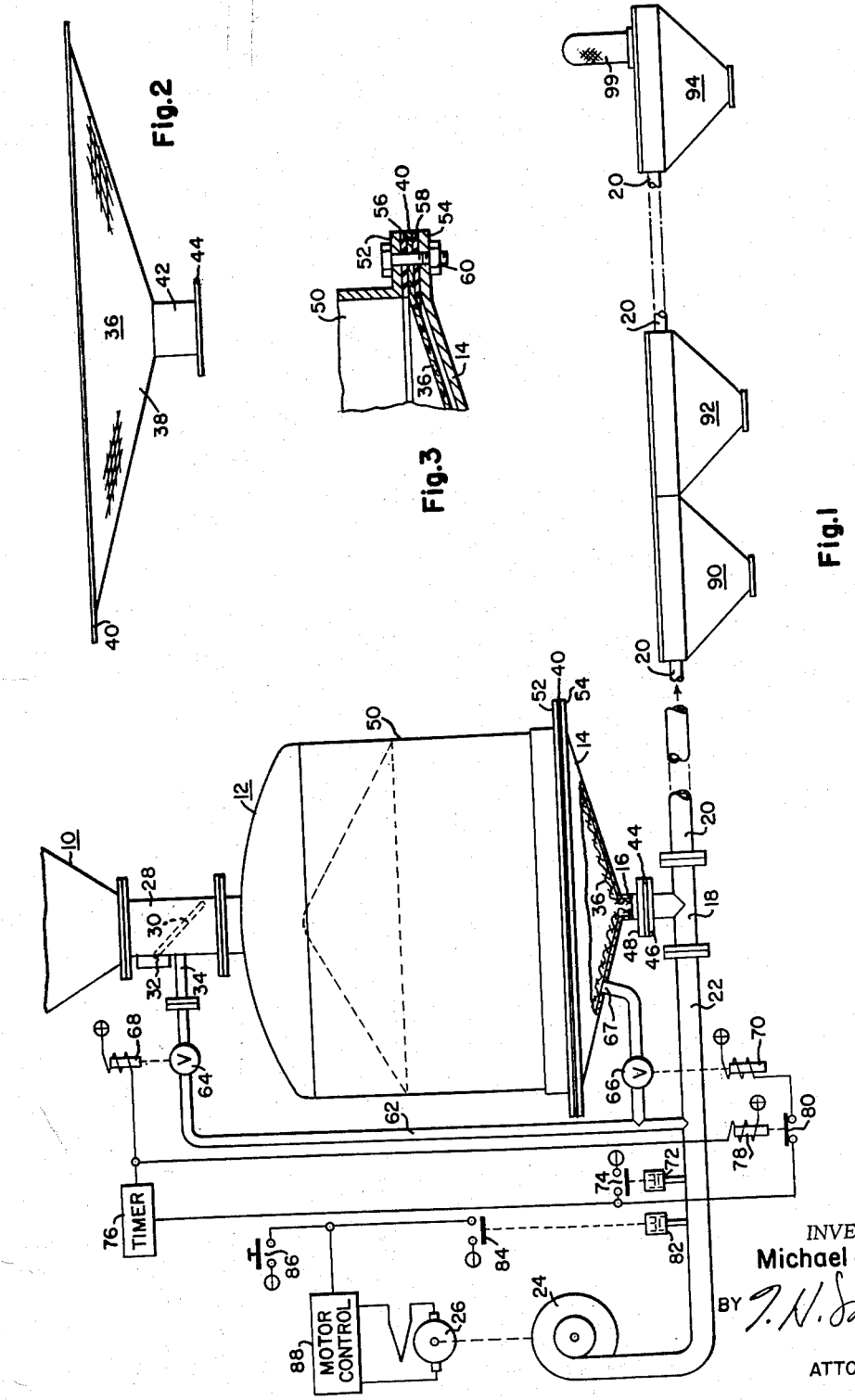
INVENTOR.
Michael J. Bozich
BY *T. N. Munoy*
ATTORNEY

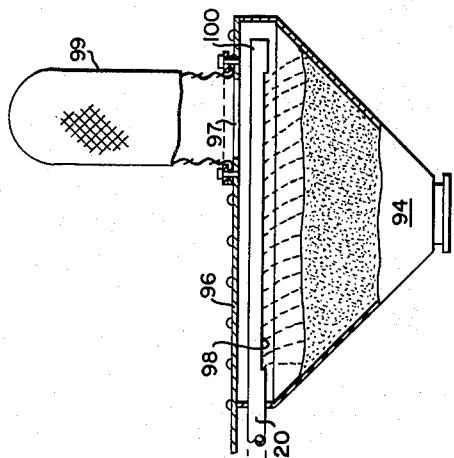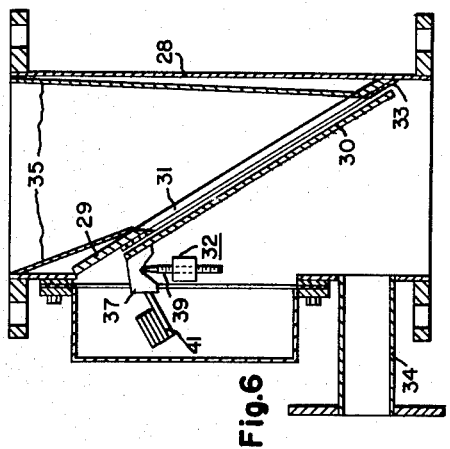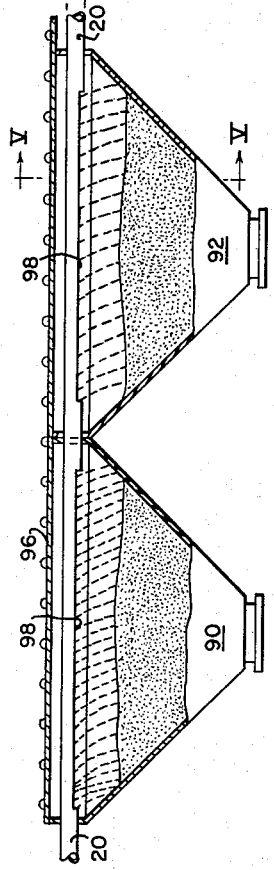

United States Patent Office
3,115,369
Patented Dec. 24, 1963

3,115,369
PNEUMATIC CONVEYING SYSTEM
Michael J. Bozich, 1059 Bayridge Ave.,
Pittsburgh 26, Pa.
Filed June 29, 1961, Ser. No. 120,719
4 Claims. (Cl. 302—28)

This invention relates to pneumatic conveying systems for granular or powdered materials, and more particularly to an improved system for feeding such materials into a pneumatic conduit as well as a system for discharging the materials from the conduit into one or more receiving bins.

Although not limited thereto, the present invention is particularly adapted for use in a pneumatic conveying system of the type shown in U.S. Patent No. 2,565,946, issued August 28, 1951. In such a system, granular or powdered material is placed in a hopper, the bottom of which is provided with a discharge opening that communicates with a conduit through which the material from the hopper is pneumatically conveyed to its destination. The material in the hopper is forced through this discharge opening into the conveying conduit by means of air pressure supplied to the hopper above the material, and the movement of the material in the conveying conduit is effected by an air blast supplied to the conduit anteriorly from its connection with the hopper, the air blast usually being created by a customary blower and blower motor mechanism. When it is desired to supply the hopper with additional material, the air blast mentioned above is shut off and additional material is poured into it.

The hopper is usually provided with a funnel-shaped bottom having an opening at its vertex from which the material in the hopper is discharged into the pneumatic conveying conduit. In the discharge of material from a hopper of this type, the phenomenon known as "arching" or "hanging up" of the material occurs which results in the material maintaining a certain angle of repose, or balance, until upset by gradual emptying, at which time there is a sudden surge, or slipping, of a large mass toward the discharge opening. The same phenomenon can be noticed when a pile of granular or powdered materials resting, for instance, in an open lot is being shoveled away, portions of the pile hanging together until a point is reached where some slight disturbance produces a sudden disruption and fall of that portion. In delivery hoppers for pneumatic conveying systems, this condition becomes particularly objectionable when it is necessary, due to space requirements or other factors, to flatten the funnel-shaped bottom (i.e., to reduce the slope of its sidewalls). In any case, regardless of the slope of the funnel-shaped bottom of the hopper, many materials such as flour, wood flour, aluminum powder, iron oxide, zinc oxide and other finely divided materials which have a very high angle of repose will not flow out of the bin unless they are aerated, meaning that air must be blown through the mass in order to dislodge it such that it will flow downwardly and out through the bottom discharge opening of the bin.

As a primary object, the present invention seeks to provide a means for conveniently aerating granular or powdered materials in the bin of a pneumatic conveying system whereby the materials will be caused to readily flow out of the bin and into the pneumatic conveying conduit. In accordance with this aspect of the invention, the aforesaid funnel-shaped bottom is provided with a porous liner formed from canvas or some other similar material, and air is forced into the bin through the liner, the arrangement being such that the air will permeate or aerate the mass and carry it downwardly into the conveying conduit while additionally providing the necessary air pressure above the material. With a system of this sort, the slope of the hopper can be varied as desired, and can even be made flat, the aeration providing sufficient agitation to cause the material to flow into the conveying conduit.

Another object of the invention is to provide new and improved means for discharging granular or powdered material from a pneumatic conveying conduit into receiving bins. Previous to this invention, it had been common to discharge the material from the conveying conduit into a plurality of bins by means of valves at each bin and either a filter unit at each bin or a pipe line from each bin leading to a central dust-collecting system. This arrangement is not only cumbersome and expensive, but also does not facilitate an even distribution within the receiving bin of material discharged from the conveying conduit.

Accordingly, in accordance with another aspect of the invention, the discharge end of the pneumatic conveying conduit is provided with one or more axially-extending slots in its bottom surface, each of which is positioned above a receiving bin. In this manner, a portion of the material traveling through the conveying conduit will drop into each bin through its associated slot in the conveying conduit, and since the slot can be made to extend along the entire length of the receiving bin, an even distribution of discharged material is formed in the bin. At the same time, instead of requiring filters at each bin as in prior methods, a filter is required only on the last bin in a plurality of such bins to permit air to be discharged into the atmosphere while retaining the granular or powdered material in the bin.

The above and other objects and features of the invention will become apparent from the following detailed description taken in connection with the accompanying drawings which form a part of this specification, and in which:

FIGURE 1 is a diagrammatic side elevation of the pneumatic conveying system of the invention;

FIG. 2 is an illustration of the porous liner used in the funnel-shaped bottom of the hopper of FIG. 1 for the purpose of aerating the granular or powdered material therein;

FIG. 3 is a cross-sectional view showing the manner in which the porous liner of FIG. 2 is secured to the funnel-shaped bottom of the hopper shown in FIG. 1;

FIG. 4 is an enlarged view of the receiving bins of the pneumatic conveying system together with the new and improved means of the invention for discharging granular or powdered material into the receiving bins;

FIG. 5 is a cross-sectional view taken along line V—V of FIG. 4; and

FIG. 6 is a cross-sectional side elevation of the flap valve structure at the top of the hopper shown in FIG. 1.

Referring now to the drawings, and particularly to FIG. 1, the material conveying apparatus consists of a pair of hoppers 10 and 12 arranged vertically one above the other. Only the lower portion of upper hopper 10 is shown, it being understood that this hopper is provided with an open top to permit granular or powdered material to be poured therein. The lower hopper 12, designated as a delivery hopper, is provided with a funnel-shaped bottom 14 having an opening 16 leading into a T-section pipe 18 which, at its right-hand end is connected to a conveying conduit 20 that conveys material to the desired place of delivery while, at its left end is connected to an air supply conduit 22. Conduit 22, in turn, communicates with a blower 24 of any standard construction, the power for such blower being supplied by an electric motor 26.

Interconnecting the hoppers 10 and 12 is a section 28 having a flap 30 therein which is pivotally connected to section 28 as at 32. Under normal conditions, the flap 30 will rotate downwardly about pivot point 32 to permit the material from hopper 10 to flow into hopper 12. When, however, an air blast is introduced into section 28 through conduit 34, air pressure will build up above the material in hopper 12 to rotate the flap 30 upwardly such that it will block off the passageway between hoppers 10 and 12 and shut off the supply of material to hopper 12.

The details of the flap 30 are shown in FIG. 6. Thus, the section 28, preferably rectangular in configuration is provided with an inner plate 29 welded or otherwise securely fastened to the walls of section 28. Provided in the plate 29 is an opening 31 adapted to be covered by the flap 30; and between the flap and the plate is a rubber or the like gasket 33. As shown, tapered inner walls 35 are provided for the purpose of directing the material from hopper 10 to the opening 31. The upper edge of the flap is provided with a V-block 37 which rests on pivot pins 39, only one of such pins being shown in FIG. 6. Carried by the T-block 37 is a counterweight 41 which tends to rotate the flap 30 into engagement with the gasket 33.

In the operation of the flap arrangement of FIG. 6, the weight of material in hopper 10 may normally rotate the flap 30 in a clockwise direction as shown in FIG. 6 to permit the material to fall into hopper 12. When, however, air is forced under pressure into section 28 and into the space above the granular or powdered material in hopper 12, the flap will be rotated in a counterclockwise direction until it is seated against gasket 33 to stop the flow of material into hopper 12. In this manner, the flap 30 acts as a valve to control the discharge of material into hopper 12.

Provided on the inner periphery of the funnel-shaped bottom 14 of hopper 12 is a porous liner 36, such liner being shown in FIG. 2. It comprises a major funnel-shaped portion 38 which conforms to the inner periphery of the funnel-shaped bottom 14. Around the periphery of the top of the funnel-shaped portion 38 is a horizontally-extending flange 40 while at the vertex of the portion 38 is an opening which communicates with a neck portion 42, this portion having a second horizontal flange 44 at its lower end. The flange 44 is secured between flanges 46 and 48 (FIG. 1) on the T-section 18 and bottom 14, respectively. The flange 40, on the other hand, is secured between the bottom edge of the sidewall 50 of hopper 12 and the upper edge of bottom 14.

The manner in which the flange 40 is secured between sidewall 50 and bottom 14 is best shown in FIG. 3. Thus, the sidewall 50 is provided with an annular, outwardly-extending flange 52; and, similarly, the upper edge of bottom 14 is provided with an annular horizontally-extending flange 54. Between the flanges 52 and 54 are annular gaskets 56 and 58 of rubber or other similar material, and sandwiched between the gaskets 56 and 58 is the annular flange 40 on liner 36. The assembly is completed by means of bolts 60 or other suitable fastening means which hold the various parts in assembled relationship and provide a compressive force for securely holding the flange 40 between gaskets 56 and 58.

Referring again to FIG. 1, connected to the conduit 22 is a vertical conduit 62 which is connected through valve 64 to conduit 34 and through valve 66 to an opening 67 in the funnel-shaped bottom 14 of bin 12. The valves 64 and 66 are preferably both of the butterfly-type; however, any other suitable valves may be used, depending upon requirements. Both of the valves 64 and 66 are controlled by solenoids, the valve 64 being controlled by solenoid 68 and the valve 66 being controlled by solenoid 70.

The solenoids 68 and 70 are controlled by a pressure switch 72 connected to the conduit 22 leading from blower 24. Pressure switch 72 is provided with a pair of normally open contacts 74, the arrangement being such that when blower 24 is turned on and the pressure builds up in conduit 22, contacts 74 will be closed to complete a circuit to a timer 76, the purpose of this timer being to energize the solenoid 68 and a relay 78 for a period of about three seconds, after which the circuit to the solenoid 68 and relay 78 is broken. During the three-second interval following closure of contacts 74, relay 78 will be energized and its normally closed contacts 80 will open, thereby preventing solenoid 70 from being energized through contacts 74 for a period of three seconds after contacts 74 are initially closed.

Also connected to conduit 22 is a second pressure switch 82 which will close its normally open contacts 84 when a back pressure is created in conduit 22 due to the fact that material is being discharged from bin 12 into T-section 18. When, however, the bin 12 is completely emptied and the back pressure falls, the pressure switch 82 will open its contacts 84.

In the operation of the device, granular or powdered material is initially permitted to fall from bin 10 through section 28 into bin 12. During this time, the blower 24 is not operating. Thereafter, a pushbutton switch 86 is manually closed to energize motor 26 through motor control circuit 88. When this occurs, the blower 24 will create a pressure in conduit 22, and this pressure will be sufficient to actuate pressure switch 82 to close its contacts 84 and maintain the energizing circuit to motor 26. At the same time, pressure switch 72 will be actuated to close its contacts 74, thereby immediately energizing solenoid 68 and relay 78 through timer 76. When solenoid 68 is energized, it opens valve 64 to permit air under pressure in conduit 62 to flow into section 28 through conduit 34, thereby closing the flap 30 and establishing a pressure above the material in bin 12. During this time, the solenoid 70 is not energized and the valve 66 is closed due to the fact that contacts 80 are now open. After about three seconds following the closure of contacts 74, the timer 76 will break the circuit to solenoid 68 and relay 78, thereby closing valve 64 and closing contacts 80. When contacts 80 close, the solenoid 70 is energized to open valve 66 whereby air under pressure is injected into the space between the inner periphery of funnel-shaped bottom 14 and the porous liner 36. The result is that air is forced up through the porous liner and the granular or powdered material whereby the material is aerated and caused to flow downwardly through opening 16 into T-section 18 where it is conveyed through conduit 20 to a plurality of receiving bins 90, 92, 94, etc., hereinafter described in detail. Due to the fact that air is blown upwardly through the mass of material in bin 12, the aeration effect produced will cause materials with high angles of repose to flow out of the bin easily; whereas, such a result could not be achieved, particularly when the funnel-shaped bottom 14 on bin 12 is flat or of low slope.

When the material has been completely discharged from bin 12, the pressure in conduit 22 will drop, thereby causing pressure switch 82 to open contacts 84 and de-energize motor 26. When motor 26 is deenergized, the pressure in conduit 22 will fall to atmospheric pressure, thereby causing the pressure switch 72 to open contacts 74 and deenergize solenoid 70 to close valve 66. The pressure within the bin 12 will now fall to atmospheric pressure to permit the flap 30 to again open, whereupon a new batch or charge of material will be fed into bin 12. A new cycle of operation is then started by depressing pushbutton switch 86.

As will be understood the electrical circuitry shown herein may be replaced by other and different circuitry as long as the valve 64 opens for about three seconds and then closes, followed by the opening of valve 66. Valve 64 is necessary since, if it were attempted to close the flap 30 by the air being forced upwardly through the granular or powdered material, the action would be too slow to be effective.

Referring now to FIGS. 4 and 5, it will be noted that conduit 20 extends through the top of each of the receiving bins 90, 92 and 94. Covering all of the bins 90, 92 and 94 is an elongated cover plate 96. The cover plate 96 is secured to each of the bins and renders the bins 90 and 92 air tight. It will be noted, however, that an opening 97 in the last bin 94 communicates with a sock-type filter 99 of porous fabric material or the like which will permit air under pressure to be discharged into the atmosphere while retaining the granular or powdered material therein in order that it may drop into the bin 94.

Provided along the bottom of the conduit 20 are a plurality of slots 98, possibly best shown in FIG. 5. Each slot extends along the length of an associated bin 90–94 while the conduit 20 terminates in a closed end as at 100 in the last bin 94. In this manner, a certain portion of the material traveling through conduit 20 will drop by gravity through one of the slots 98 into each one of the bins 90, 92 and 94. Furthermore, the material will flow out of the slots 98 and into the bins in a sort of a liquid fashion and maintain a fairly even level of discharged material in the bin. The purpose of the filter sock 99 will be obvious to those skilled in the art. That is, it is necessary to have such a filter in order to permit air under pressure to be discharged from the last bin 94 into the atmosphere. Otherwise, due to the fact that all of the bins, with the exception of bin 94, are air tight, a back pressure would develop which would eventually stall the system. Whereas, in previous systems of this sort, the material was discharged into each receiving bin under air pressure through the open end of a conduit, the present invention provides a means whereby the material falls by gravity into each bin with the air under pressure escaping under pressure from the last bin only. In other words, instead of forcing the material into each bin under pressure as in previous systems, it simply falls into each bin by gravity, it being understood that the pressure in each bin, except the last, will be substantially the same as that in conduit 20. This not only provides for a more even distribution of granular or powdered material discharged into each bin, but also eliminates the necessity for a filter on each bin or some type of central dust-collecting system connected to each bin.

As will be understood, the pressure within conduit 20 will fall along its length, the pressure at the extreme right end adjacent sock 99 as viewed in FIG. 1 being atmospheric pressure. Let us assume, for example, that the pressure in conduit 20 at the inlet to bin 90 is 14.7 pounds per square inch above atmospheric pressure, meaning that there will be a pressure drop of 14.7 pounds per square inch along the entire length of the conduit. Furthermore, as the pressure drops along the length of the conduit, the gas will expand and its velocity will increase. In the particular case given, the velocity at the inlet to bin 90 may, for example, be six thousand feet per minute, and that at the last bin 94 twelve thousand feet per minute due to the expansion of the gas and drop in pressure. If it is desired to fill all of the bins 90–94 with equal amounts of finely divided material, the slot in the last bin 94 must be longer than that in the first bin 90 due to the increased velocity of the gas. That is, since the velocity of the gas passing through the conduit in bin 90 is lower than that in bin 94, the finely divided material will be traveling at a lower speed through the conduit 20 in bin 90 than in bin 94. The result is that more material will fall through a slot of given length in bin 90 than will fall through a slot of the same length in bin 94. This, of course, assumes that all slots are of the same width. It can be seen, therefore, that if equal amounts of material are to be discharged into the bins, the slots must be progressively longer in each bin starting from bin 90 and ending at bin 94. Of course, whether it is desired to discharge equal amounts in each bin or varying amounts in different bins is a design consideration, dependent upon the use to which the system is to be put. However, the system will operate with material being discharged in successive bins regardless of the relative sizes of the slots, just so long as the width of each slot is constant along its length.

The system can be extended to any desired number of bins; however in order for material to be discharged into all of the bins, the slots must be properly dimensioned so that all of the material will not fall into the first bins along the conduit 20 with none remaining for the latter bins. This, again, is a design consideration dependent upon the velocity of the gas in the conduit, the number of hoppers desired, and the diameter of the conduit.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a system for pneumatically conveying finely divided materials, the combination of a pneumatic conveying passageway, a closed feed hopper having a generally funnel-shaped bottom with an opening at its vertex for discharging the contents of the hopper into said passageway, means for supplying a stream of air into said passageway to move the finely divided material therealong, a flexible funnel-shaped porous liner member for the inner surface of said funnel-shaped bottom, said liner being in abutment with the inner surface of said bottom when air is not forced into the hopper through the porous liner, a source of air under pressure, first conduit means for connecting said source of air under pressure to the interior of said hopper above the material therein, a port in the bottom of said hopper beneath said porous liner, a second conduit means for connecting said port to said source of air under pressure, first valve means in the first conduit means for controlling the flow of air under pressure into the hopper above the material stored therein, second valve means in the second conduit means for controlling the flow of air into the hopper through said port and beneath said porous liner, and control means operable when a stream of air is initially supplied into said conveying passageway for opening the first valve means while maintaining the second valve means closed for a predetermined period of time, said control means serving to close the first valve means and open the second valve means at the expiration of said predetermined period of time.

2. In a system for pneumatically conveying solid materials of powdered form, the combination of a pneumatic conveying conduit, a feed hopper having a generally funnel-shaped bottom with an opening at its vertex for discharging the contents of the hopper into said conduit, a flexible funnel-shaped porous liner member for said bottom, means for supplying a stream of air into said conduit to move the powdered material therealong, a bin positioned above said hopper whereby powdered material stored in the bin may be fed by gravity into the hopper, a pressure responsive valve positioned in the path of flow of the material from the bin to the hopper, means for forcing air under pressure into the hopper for a predetermined period of time to close said valve and establish a downward force on the material in the hopper, and means operable at the expiration of said predetermined period of time for thereafter forcing air under pressure into the hopper through said porous liner member whereby the powdered material will be aerated and caused to flow through said opening into the pneumatic conveying conduit.

3. In a system for pneumatically conveying finely divided materials, the combination of a horizontal pneumatic conveying conduit, means for feeding finely divided materials into the conduit, means for supplying a stream of air into one end of said conduit to move the finely divided materials therealong, a plurality of independent and separated receiving bins spaced along said conveying conduit with the bins being beneath the conduit, each of said bins except the last being air-tight, and a plurality of axially-extending slots in the bottom of said conduit with each slot communicating with an associated one of said bins whereby the material passing through each slot will fall into a single bin only, the arrangement being such that the pressure in each bin will be substantially equal to the pressure in the conduit directly above it whereby the finely divided material will fall through said slots into the bins instead of being forced into the bins under pressure.

4. In a system for pneumatically conveying finely divided materials, the combination of a horizontal pneumatic conveying conduit, means for feeding finely divided materials into the conduit, said finely divided materials comprising separate particles each of substantially the same weight, means for supplying a stream of air into one end of said conduit to move the finely divided materials therealong, a plurality of independent and separated receiving bins spaced along said conveying conduit with the bins being beneath the conduit, each of said bins except the last being air-tight, a filter connected to said last bin to permit air under pressure to be discharged into the atmosphere while retaining the finely divided material in the last bin, and a plurality of axially-extending slots in the bottom of said conduit with each slot communicating with an associated one of said bins whereby material passing through each slot will fall into a single bin only, the arrangement being such that the pressure in each bin will be substantially equal to the pressure in the conduit directly above it whereby the finely divided material will fall through said slots into the bins instead of being forced into the bins under pressure, the velocity and pressure of said air stream being such that at least a portion of said finely divided material will pass through each of said slots into an associated one of said bins.

References Cited in the file of this patent

UNITED STATES PATENTS

| | | |
|---|---|---|
| 304,982 | Wiesebrock | Sept. 9, 1884 |
| 1,309,671 | Weaver | July 15, 1919 |
| 1,707,206 | Bernert | Mar. 26, 1929 |
| 1,759,983 | Houston | May 27, 1930 |
| 2,527,455 | Schemm | Oct. 24, 1950 |
| 2,565,946 | Bozich | Aug. 28, 1951 |
| 2,734,782 | Galle | Feb. 14, 1956 |
| 2,792,262 | Hathorn | May 14, 1957 |
| 2,805,897 | Yellott | Sept. 10, 1957 |
| 2,897,009 | Gianniny | July 28, 1959 |
| 2,924,489 | Beckmann | Feb. 9, 1960 |
| 2,943,891 | Paton | July 5, 1960 |
| 3,024,072 | Hermanns | Mar. 6, 1962 |

FOREIGN PATENTS

| | | |
|---|---|---|
| 731,727 | Great Britain | June 15, 1955 |
| 765,158 | Great Britain | Jan. 2, 1957 |